United States Patent
Phelps et al.

(10) Patent No.: US 10,621,269 B2
(45) Date of Patent: Apr. 14, 2020

(54) PERFORMING MATRIX MULTIPLICATION IN HARDWARE

(71) Applicant: Google LLC, Mountain View, CA (US)

(72) Inventors: Andrew Everett Phelps, Middleton, WI (US); Norman Paul Jouppi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 15/983,047

(22) Filed: May 17, 2018

(65) Prior Publication Data

US 2018/0336165 A1    Nov. 22, 2018

Related U.S. Application Data

(60) Provisional application No. 62/507,748, filed on May 17, 2017.

(51) Int. Cl.

| | | |
|---|---|---|
| G06F 17/16 | (2006.01) | |
| G06N 3/02 | (2006.01) | |
| G06F 7/487 | (2006.01) | |
| G06F 7/483 | (2006.01) | |
| G06F 9/30 | (2018.01) | |
| G06N 3/04 | (2006.01) | |
| G06N 3/063 | (2006.01) | |

(52) U.S. Cl.
CPC ............ *G06F 17/16* (2013.01); *G06F 7/483* (2013.01); *G06F 7/4876* (2013.01); *G06F 9/30014* (2013.01); *G06N 3/02* (2013.01); *G06N 3/0481* (2013.01); *G06N 3/063* (2013.01)

(58) Field of Classification Search
CPC ........ G06F 17/16; G06F 7/483; G06F 7/4876; G06N 3/02
USPC .................................................. 708/514, 607
See application file for complete search history.

(56) References Cited

U.S. PATENT DOCUMENTS

| 5,548,545 A | 8/1996 | Brashears et al. |
| 2012/0191967 A1 | 7/2012 | Lin et al. |
| 2016/0321071 A1 | 11/2016 | Hansen et al. |

OTHER PUBLICATIONS

PCT International Application No. PCT/US2018/033271, dated Sep. 13, 2018, 13 pages.
TW Office Action in Taiwan Appln. No. 107116873, dated Jun. 11, 2019, 12 pages (with English translation).

*Primary Examiner* — Tan V Mai
(74) *Attorney, Agent, or Firm* — Fish & Richardson P.C.

(57) ABSTRACT

Methods, systems, and apparatus for performing a matrix multiplication using a hardware circuit are described. An example method begins by obtaining an input activation value and a weight input value in a first floating point format. The input activation value and the weight input value are multiplied to generate a product value in a second floating point format that has higher precision than the first floating point format. A partial sum value is obtained in a third floating point format that has a higher precision than the first floating point format. The partial sum value and the product value are combined to generate an updated partial sum value that has the third floating point format.

15 Claims, 11 Drawing Sheets

PERFORMING MATRIX MULTIPLICATION IN HARDWARE

CROSS-REFERENCE TO RELATED APPLICATION

This application claims the benefit of the filing date of U.S. Application No. 62/507,748, filed on May 17, 2017. The disclosure of the prior application is considered part of and is incorporated by reference in the disclosure of this application.

BACKGROUND

This specification relates to performing neural network computations in hardware.

Neural networks are machine learning models that employ one or more layers to generate an output, e.g., a classification, for a received input. Some neural networks include one or more hidden layers in addition to an output layer. The output of each hidden layer is used as input to another layer in the network, e.g., the next hidden layer or the output layer of the network. Each layer of the network generates an output from a received input in accordance with current values of a respective set of parameters.

SUMMARY

In general, this specification describes a special-purpose hardware circuit that computes neural network inferences.

In general, one innovative aspect of the subject matter described in this specification can be embodied in methods of performing a matrix multiplication using a hardware circuit that include the actions of obtaining, by a matrix computation unit of the hardware circuit, an input activation value and a weight input value, the input activation value and the weight input value each having a first floating point format; multiplying, by a multiplication circuitry of the matrix computation unit, the input activation value and the weight input value to generate a product value, the product value having a second floating point format that has a higher precision than the first floating point format and has a dynamic range that is at least as large as the dynamic range of the first floating point format; obtaining, by the matrix computation unit, a partial sum value in a third floating point format that has a higher precision than the first floating point format and has a dynamic range that is at least as large as the dynamic range of the first floating point format; and combining, by a summation circuitry of the hardware circuit, at least the partial sum value and the product value to generate an updated partial sum value that has the third floating point format.

Embodiments of this aspect can include one or more of the following optional features. The precision of a floating point format can be determined based on a count of available bits for a significand in the floating point format and the dynamic range of a floating point format can be determined based on a count of available bits for an exponent in the floating point format. The second floating point format can have the same dynamic range as the first floating point format and the third floating point format can have the same dynamic range as the first floating point format. The third floating point format can have a higher precision than the second floating point format.

The hardware circuit can be configured to perform computations for a neural network having a plurality of layers, and the input activation value and the weight input value can be associated with a layer of the plurality of layers.

The methods can include the actions of obtaining a raw activation value and a raw weight value for the first matrix computation cell having the third floating point format; converting the raw activation value into the first floating point format to generate the input activation value; and converting the raw weight value into the first floating point format to generate the weight input value. The methods can further include the actions of receiving a request to process the raw activation value with enhanced precision; generating an activation enhanced precision value for the input value, the activation enhanced precision value being a measure of difference between the activation input value and the raw activation value; and generating a weight enhanced precision value for the weight input value, the weight enhanced precision value being a measure of difference between the weight input value and the raw weight value. Multiplying the activation input value and the weight input value to generate the product value can include the actions of multiplying, by the multiplication circuitry of the matrix computation unit, the input value by the weight input value, the input value by the weight enhanced precision value, the weight input value by the activation enhanced precision value, and the activation enhanced precision value by the weight enhanced precision value; and combining products of the multiplications to generate the product value.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Another innovative aspect of the subject matter described in this specification can be embodied in hardware circuits that include a matrix computation unit configured to perform a first group of operations including: obtaining an activation input value and a weight input value, the activation input value and the weight input value both having a first floating point format; storing the weight input value in a weight register, the weight register being configured to store values having the first floating point format; multiplying, a using multiplication circuitry of the hardware circuit, the activation input value and the weight input value to generate a product value, the product value having a second floating point format that has a higher precision than the first floating point format and has a dynamic range that is at least as large as the dynamic range of the first floating point format; obtaining a partial sum value in a third floating point format that has a higher precision than the first floating point format and has a dynamic range that is at least as large as the dynamic range of the first floating point format; storing the partial sum value in a sum in register, the sum in register being configured to store values having the third floating point format; and combining, using a summation circuitry of the matrix computation unit, the partial sum value and the product value to generate an updated partial sum value that has the third floating point format.

Embodiments of this aspect can include one or more of the following optional features. The first group of operations can include storing the activation input value in an activation register, the activation register being configured to store values having the first floating point format. The first group of operations can include storing the weight input value in a weight register, the weight register being configured to store values having the first floating point format. The first group of operations can include storing the partial sum value in a sum in register, the sum in register being configured to store values having the third floating point format. The hardware circuit can include an external summation circuitry outside the matrix computation unit. The first group of operations can include receiving a request to process the raw activation value with enhanced precision; generating an activation enhanced precision value for the input value, the activation enhanced precision value being a measure of difference between the activation input value and the raw activation value; and generating a weight enhanced precision value for the weight input value, the weight enhanced precision value being a measure of difference between the weight input value and the raw weight value. Multiplying the activation input value and the weight input value to generate the product value can include the actions of multiplying, by the multiplication circuitry of the matrix computation unit, the input value by the weight input value, the input value by the weight enhanced precision value, the weight input value by the activation enhanced precision value, and the activation enhanced precision value by the weight enhanced precision value. The external summation circuitry can be configured to perform a second group of operations including combining products of the multiplications to generate the product value.

Other embodiments of this aspect include corresponding computer systems, apparatus, and computer programs recorded on one or more computer storage devices, each configured to perform the actions of the first group of operations and/or the second group of operations. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. A hardware circuit can perform matrix multiplication with reduced overflow and/or loss of precision. A hardware circuit can perform matrix multiplication with enhanced precision beyond the precision provided by the floating point format of input registers in the hardware circuit. A hardware circuit can perform matrix multiplication on an input matrix whose values are stored using an IEEE single-precision floating point format with reduced overflow even though the hardware circuit stores the input matrix values in a floating point format with 16 bits.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be used to perform computations. For example, given an input, the neural network can compute an inference for the input. The neural network computes this inference by processing the input through each of the layers of the neural network. Each layer receives an input and processes the input in accordance with the set of weights for the layer to generate an output.

Therefore, in order to compute an inference from a received input, the neural network receives the input and processes it through each of the neural network layers to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a sequence. In some other implementations, the layers are arranged as directed graph. That is, any particular layer can receive multiple inputs, multiple outputs, or both. The layers of the neural network can also be arranged such that an output of a layer can be sent back as an input to a previous layer.

The neural network can also be trained to determine trained values of the weights of the layers in the neural network. Generally, during the training, inputs are processed using the neural network and the weights are adjusted based on the outputs generated by the neural network for the inputs.

This specification describes special-purpose hardware circuitry that performs neural network computations, i.e., inference or training operations, including matrix multiplication operations performed by the neural network layers.

Figure 1A:
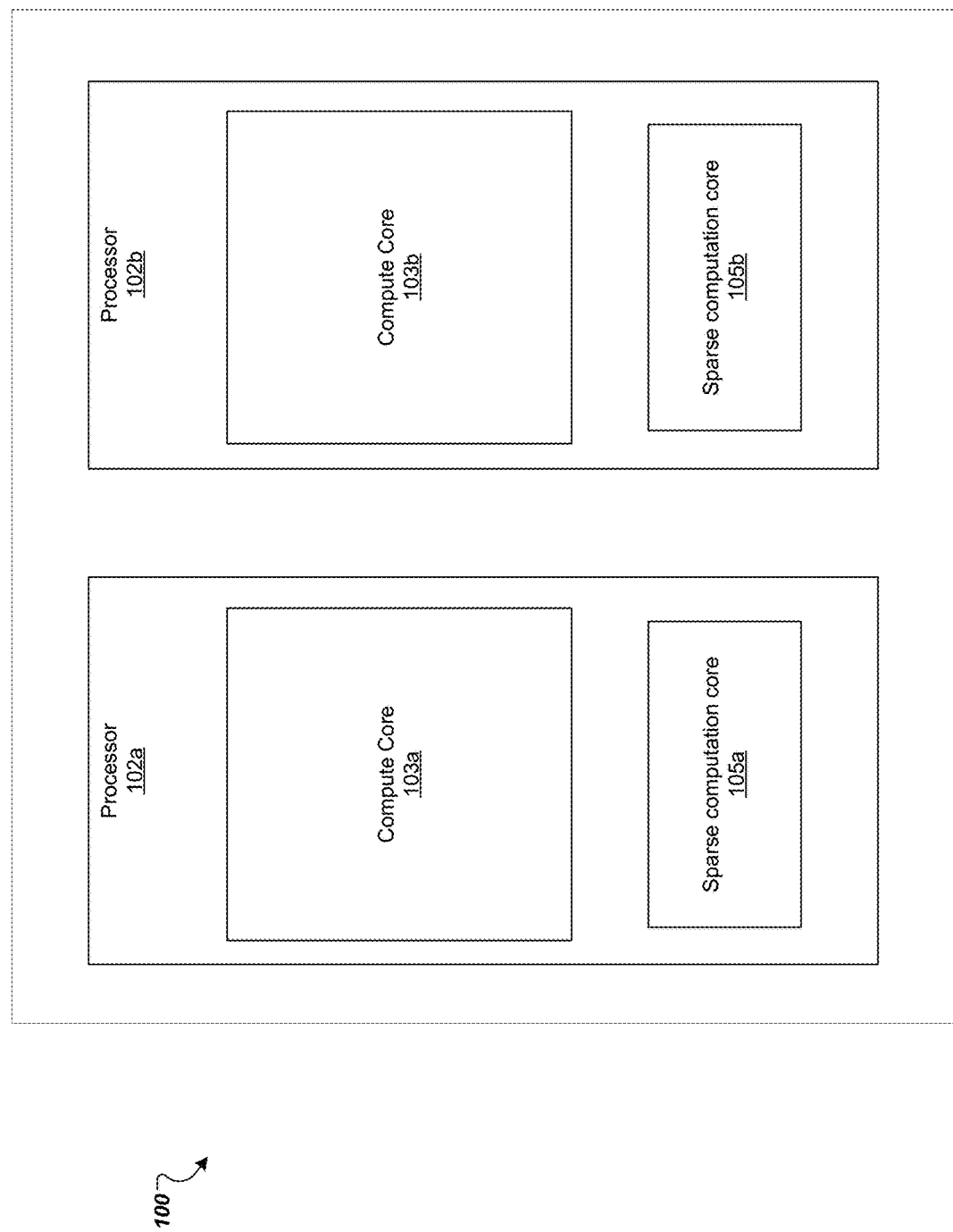
FIG. 1A shows a high-level diagram of an example special-purpose hardware chip for training a neural network.

FIG. 1A shows a high-level diagram of an example special-purpose hardware chip for training a neural network. As illustrated, a single special-purpose hardware chip includes two independent processors (102a, 102b). Each processor (102a, 102b) contains two distinct cores: (1) a compute core, i.e., a very long instruction word (VLIW) machine, (103a, 103b) and (2) a sparse computation core, i.e., an embedding layer accelerator, (105a, 105b).

Each compute core (103a, b) is optimized for dense linear algebra problems. Each compute core executes its own stream of very long instruction word instructions.

An example sparse computation core (105a, b) maps very sparse, high-dimensional data into dense, low-dimensional data so that the rest of the layers process densely packed input data. For example, the sparse computation core can perform the computation of any embedding layers in the neural network being trained.

To perform this sparse-to-dense mapping, the sparse computation core uses a pre-built lookup table, an embedding table. For example, when there is a series of query words as user input, each query word is converted into a hash identifier or a one-hot encoded vector. Using the identifier as a table index, the embedding table returns the corresponding dense vector, which can be an input activation vector to the next layer. The sparse computation core can also perform reduction operations across the search query words to create one dense activation vector. The sparse computation core performs efficient sparse, distributed lookups since the embedding table can be huge and not fit in the limited capacity high bandwidth memory of one of the special-purpose hardware chips. More details about the sparse computation core functionality can be found in U.S. patent application Ser. No. 15/016,486, entitled MATRIX PROCESSING APPARATUS, which was filed on Feb. 5, 2016.

Figure 1B:
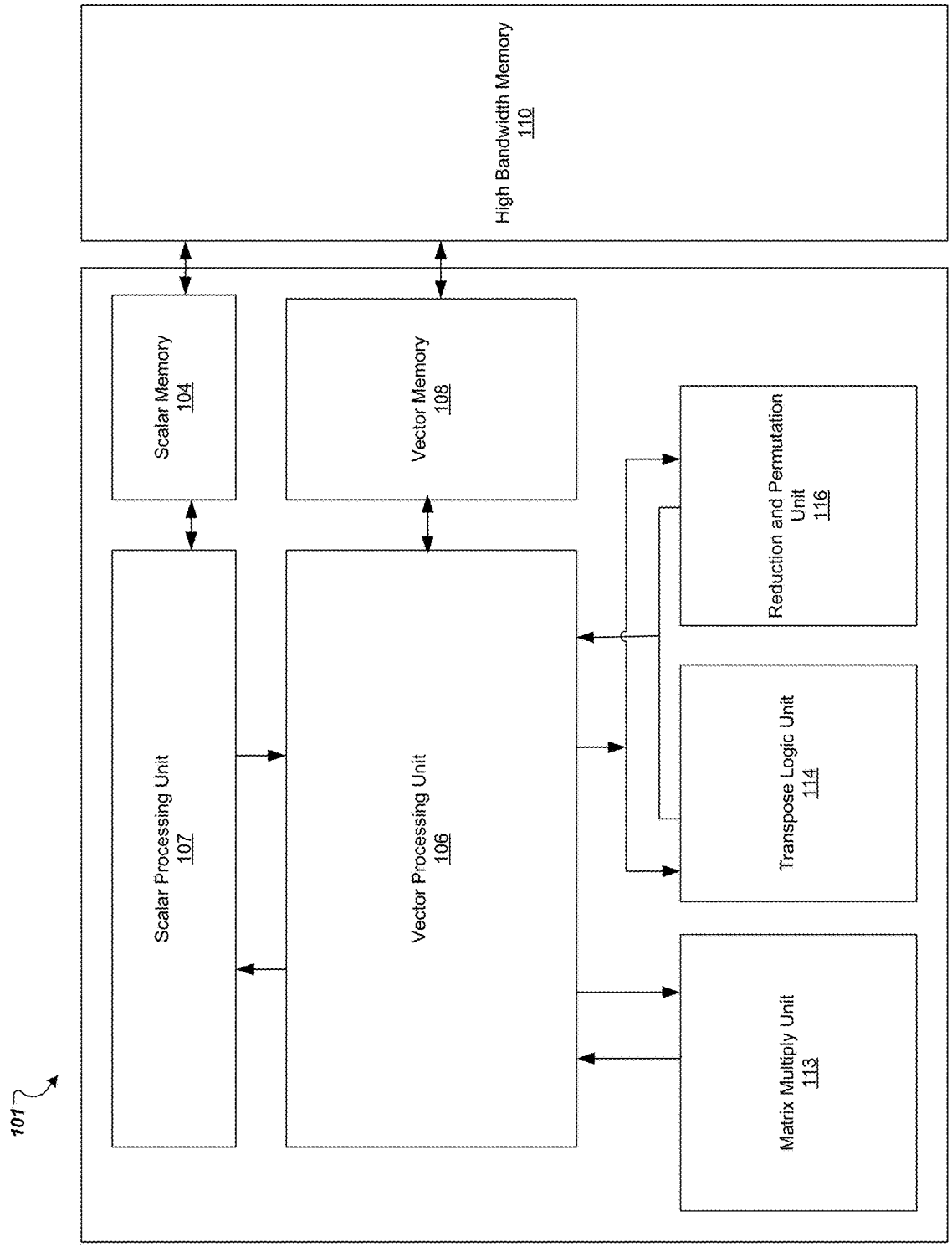
FIG. 1B shows a high-level example of compute core.

FIG. 1B shows a high-level example of compute core (101). The compute core can be a machine, i.e., a VLIW machine, that controls several compute units in parallel. Each compute core (101) contains: a scalar memory (104), a vector memory (108), a scalar processor (107), vector registers (106), and extended vector units (i.e., a matrix multiply unit (MXU) (113), a transpose unit (XU) (114), and a reduction and permutation unit (RPU) (116)).

An example scalar processor performs VLIW instruction fetch/execute loop and controls the compute core. After fetching and decoding an instruction bundle, the scalar processor itself only executes the instructions found in the scalar slots of the bundle using multiple, multi-bit registers, i.e., 32 32-bit registers of the scalar processor (107) and scalar memory (104). The scalar instruction set includes normal arithmetic operations, e.g., as used in address calculations, load/store instructions, and branch instructions. The remaining instruction slots encode instructions for the vector processor or other extended vector units (113, 114, 116). The decoded vector instructions are forwarded to the vector processor.

Along with vector instructions, the scalar processor (107) can forward values of up to three scalar registers to the other processor and units to perform operations. The scalar processor can also directly retrieve computation results from the vector processor. However, in some implementations, the example chip has a low-bandwidth communication path from the vector processor to the scalar processor.

A vector instruction dispatcher sits between the scalar processor and the vector processor. This dispatcher receives decoded instructions from the non-scalar VLIW slots and broadcasts those instructions to the vector processor. The vector processor is described in detail with respect to FIG. 1C.

An example scalar processor (107) accesses a small, fast, private scalar memory (104), which is backed up by a much larger, but slower High Bandwidth memory (HBM) (110). Similarly, an example vector processor accesses a small, fast, private vector memory (108), which is also backed up by the HBM (110). Word-granularity access occurs between either the scalar processor (107) and the scalar memory (104) or the vector processor and the vector memory (108). The granularity of loads and stores between the vector processor and the vector memory is a vector of 128 32-bit words. Direct memory access occurs between the scalar memory (104) and the HBM (110) and the vector memory (108) and the HBM (110). In some implementations, memory transfers from the HBM (110) to the processors (107) may only be done through the scalar or vector memories (107). Additionally, there may be no direct memory transfers between the scalar memory and the vector memory.

Instructions may specify extended vector unit operations. Along with each executed vector unit instruction, there are two-dimensional, i.e., 128 by 8, vector units that each can send one register value to the extended vector units as input operands. Each extended vector unit takes the input operands, performs corresponding operations, and returns the results back to the vector processor (306). The extended vector units will be described below with respect to FIG. 4.

Figure 1C:
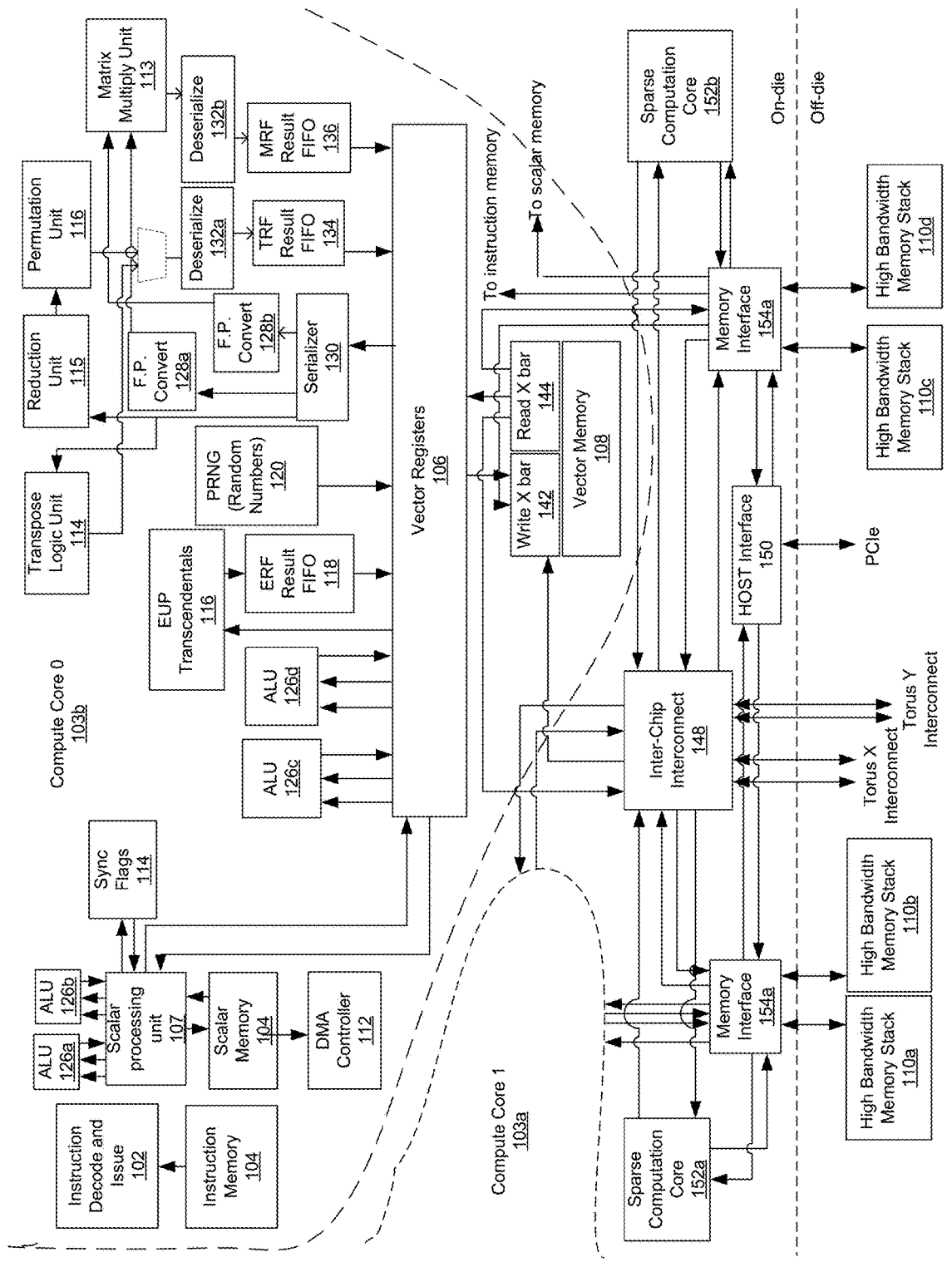
FIG. 1C shows an example neural network processing system.

FIG. 1C shows an example special-purpose integrated circuit 100 for performing neural network computations. As illustrated, the chip contains two compute cores (103a, 103b) and two sparse computation cores (152a, 152b).

The chip has a shared area which includes a host interface to a host computer (150), four stacks of high bandwidth memory along the bottom (156a-156d), and an inter-chip interconnect (148) connecting the interfaces and memory together, as well as data from other chips. Two stacks of high bandwidth memory (156a-b, 156c-d) are associated with each compute core (103a, 103b).

The chip stores data in high bandwidth memory (156c-d), reads the data in and out of vector memory (108), and processes the data. The compute core (103b) itself includes a vector memory (108) that is on-chip S-RAM which is divided into two dimensions. The vector memory has address space in which addresses hold floating point numbers, i.e., 128 numbers that are each 32-bits. The compute core (103b) also includes a computational unit that computes values and a scalar unit that controls the computational unit.

The vector processor consists of a 2-dimensional array of vector processing units, i.e., 128×8, which all execute the same instruction in a single instruction, multiple-data (SIMD) manner. The vector processor has lanes and sublanes, i.e., 128 lanes and 8 sublanes. Within the lane, the vector units communicate with each other through load and store instructions. Each vector unit can access one 4-byte value at a time. Vector units that do not belong to the same lane cannot communicate directly. These vector units must use the reduction/permutation unit which is described below.

The computational unit includes vector registers, i.e., 32 vector registers, in a vector processing unit (106) that can be used for both floating point operations and integer operations. The computational unit includes two arithmetic logic units (ALUs) (126c-d) to perform computations. One ALU (126c) performs floating point addition and the other ALU (126d) performs floating point multiplication. Both ALUs (126c-d) can perform various other operations such as shifts, masks, and compares. For example, a compute core (103b) may want to add a vector register, $V_1$, and a second vector register, $V_2$, and put the results in a third vector register, $V_3$. In order to compute the addition, the compute core (103b) performs multiple, i.e., 1024, operations in one clock cycle. Using these registers as operands, each of the vector units can simultaneously execute two ALU instructions, and one load and one store instruction, every clock cycle. A base address for a load or a store instruction can be computed in the scalar processor and forwarded to the vector processor. Each of the vector units in each sublane can compute its own offset address using various methods such as striding and a special indexed address register.

The computational unit also contains an extended unary pipeline (EUP) (116) that performs operations such as square root and reciprocal. The compute core (103b) takes three clock cycles to perform these operations since they take in one operand at a time. Since the EUP processing takes more than one clock cycle, there is a first-in-first-out data storage to store results. When an operation is finished, the results are stored in the FIFO. The compute core can use a separate instruction at a later time to pull the data out of the FIFO and put it in the vector register. A random number generator (120) allows the compute core (103b) to generate random numbers per cycle, i.e., 128 random numbers per cycle.

As described above, each processor has three extended vector units: a matrix multiply unit (113) which performs matrix multiplication operations; a cross-lane unit (XLU) that includes a transpose unit (XU) (114) which performs a transposition operation of a matrix, i.e., 128 by 128 matrix, and a reduction and permutation unit (illustrated as separate units in FIG. 1C, reduction unit 115 and permutation unit 116).

The matrix multiply unit performs matrix multiplications between two matrices. The matrix multiply unit (113) takes in data since the compute core needs to load in a set of numbers which is the matrix that is going to be multiplied. As illustrated, data comes from the vector registers (106). Each vector register contains 128×8 numbers, i.e., 32-bit numbers. However, floating point conversion may occur as data is sent to the matrix multiply unit (113) to change the numbers to a smaller bit size, i.e., from 32-bit to 16-bit. A serializer (130) ensures when numbers are read out of the vector registers, a two-dimensional array, i.e., a 128 by 8 matrix, is read as sets of 128 numbers that are sent to the matrix multiply unit (113) for each of the next eight clock cycles. After the matrix multiply has completed its computations, the results are deserialized (132a,b) which means that result matrix is held for a number of clock cycles. For example, for a 128×8 array, 128 numbers are held for each of 8 clock cycles and then pushed to a FIFO, the transpose result FIFO (TRF) 134 or the multiply result FIFO (MRF) 136 so that a two-dimensional array of 128×8 numbers can be grabbed in one clock cycle and stored in the vector registers (106).

Over a period of cycles, i.e., 128 cycles, weights are shifted into the matrix multiply unit (113) as the numbers by which to multiply the matrix. Once the matrix and weights have been loaded, the compute core (103b) can send sets of numbers, i.e., 128×8 numbers, to the matrix multiply unit (113). Each line of the set can be multiplied by the matrix to produce a number of results, i.e. 128, results per clock cycle. While the compute core is performing matrix multiplies, the compute core also shifts new sets of numbers in the background to be the next matrix by which the compute core will multiple so that the next matrix is available when the computational process for the previous matrix has completed. The matrix multiply unit (113) can process weight inputs and activation inputs and provide a vector of outputs to the vector registers 106. The vector processing unit can process the vector of outputs and store a vector of processed outputs to the vector memory. For example, the vector processing unit can apply a non-linear function to outputs of the matrix multiply unit to generate activated values. In some implementations, the vector computation unit 114 generates normalized values, pooled values, or both. The vector of processed outputs can be used as activation inputs to the matrix multiply unit 112, e.g., for use in a subsequent layer in the neural network.

The transpose unit transposes a matrix. The transpose unit (114) takes in numbers and transposes them so that the number across a lane is transposed with the number in the other dimension. In some implementations, the vector processor includes 128×8 vector units. Therefore, to transpose a 128×128 matrix, sixteen individual transpose instructions are needed for the full matrix transpose. Once the transposition is finished, the transposed matrix will be available. However, an explicit instruction is needed to move the transposed matrix into the vector register file.

The reduction/permutation unit (or units 115, 116) addresses the problem of cross-lane communication by supporting various operations such as permutation, lane rotation, rotating permutation, lane reduction, permuted lane reduction, and segmented permuted lane reduction. As illustrated, these computations are separate, however, a compute core can use one or the other or one chained to the other. The reduction unit (115) reduces each line of numbers and feeds the numbers into the permutation unit (116). The permutation unit alters data between different lanes. The transpose unit, the reduction unit, the permutation unit, and the matrix multiply unit each take more than one clock cycle to complete. Therefore, each unit has a FIFO associated with it so that the results of computations can be pushed to the FIFO and a separate instruction can be executed at a later time to pull the data out of the FIFO and into a vector register. By using FIFOs, the compute core does not require multiple vector registers to be reserved for the duration of lengthy operations. As illustrated, each of the units takes data from the vector registers (106).

The compute core uses a scalar unit to control the computational unit. The scalar unit has two primary functions: (1) performing loop counting and addressing and (2) generating direct memory address (DMA) requests so that the DMA controller moves data in the background between the high bandwidth memory (156c-d) and vector memory (108) and then to the inter-chip connect (148) to other chips in an example system. The scalar unit contains an instruction memory (104), an instruction decode and issue (102), scalar processing unit (107) that contains scalar registers, i.e., 32-bit, a scalar memory (104), and two ALUs (126a,b) for performing two operations per clock cycle. The scalar unit can feed operands and immediate values into the vector operations. Each instruction can be sent from the instruction decode and issue (102) as an instruction bundle that contains the instructions that execute on the vector registers (106). Each instruction bundle is a very long instruction word (VLIW) with each instruction being a number of bits wide, divided into a number of instruction fields.

Figure 2:
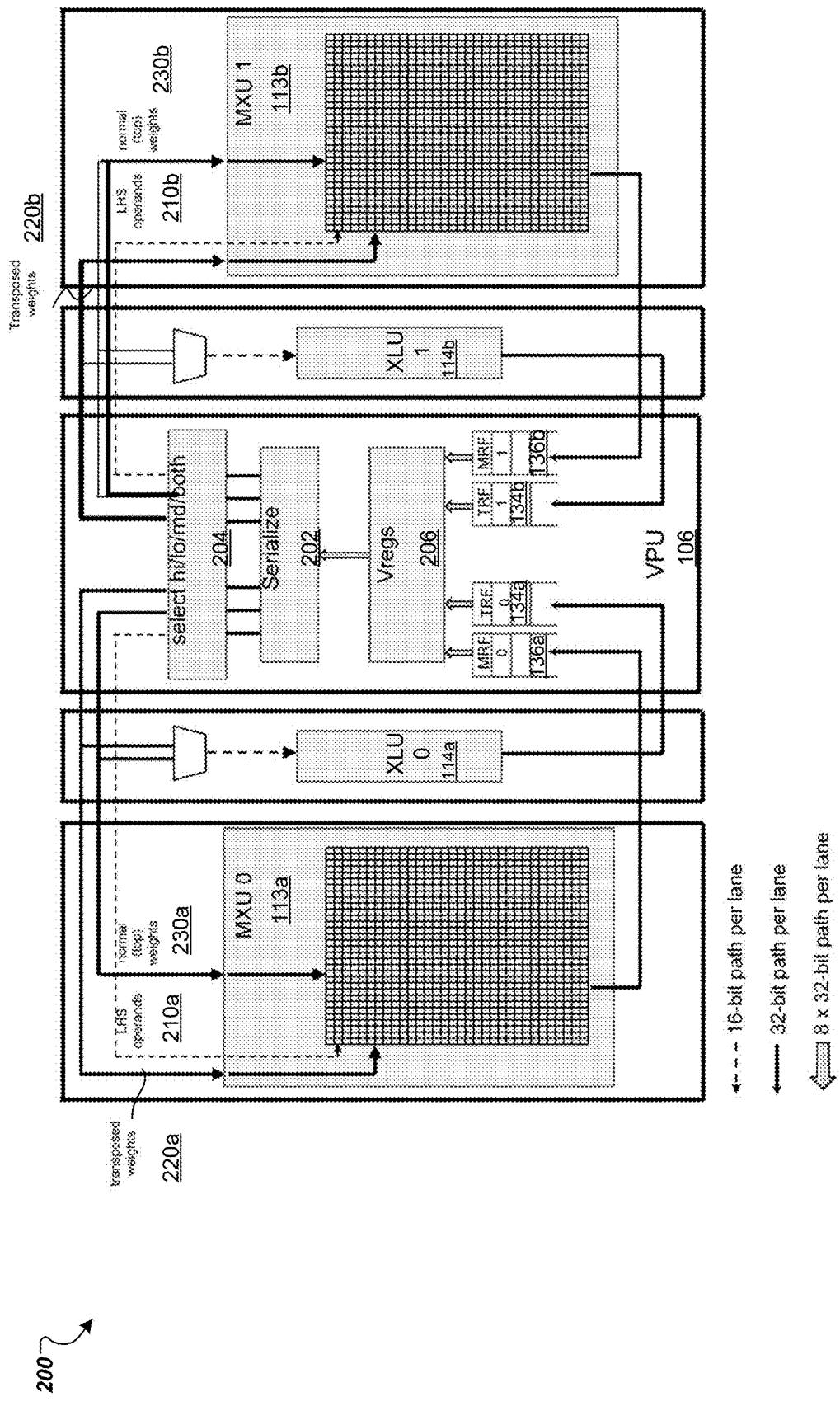
FIG. 2 illustrates an example architecture including a matrix multiply unit. The matrix multiply unit is a two-dimensional systolic array.

FIG. 2 illustrates an example architecture 200 that includes matrix multiply units (MXUs) 201a and 201b. Each MXU is a two-dimensional systolic array. The array is wired to perform matrix multiply operations. An MXU multiplies a 128-element vector by a pre-loaded 128×128 matrix, with a constant throughput of one multiplication per clock cycle.

Each MXU may have 128 rows and 128 columns. An MXU can be divided into identical blocks, referred to as tiles. For example, an MXU can be divided into 32 tiles, each of which contain 32 rows by 16 columns. Each tile can further be divided into multiply-add sub unit cells. Each cell takes a vector data input operand, multiplies the operand by stored weights to obtain a result, and adds the result to a partial sum to produce a new partial sum. In some implementations, the sub-unit cells can be grouped into larger multi-cells, i.e., 2×2 arrays of multiply-add sub-unit cells or 4×4 arrays of multiply-add sub-unit cells, referred to as sedecim cells. Instead of moving input data from one multiply-add sub-unit cell to the next at a rate of one per clock cycle, the data can move across the systolic array at one multi-cell per clock cycle.

Before beginning a series of vector-matrix multiplies, a matrix needs to be pre-loaded into the MXU. The data for this matrix is called the "weights" data. The weights matrix is delivered to the MXU over source buses by the buses connected to the MXU and shifted into weight shift registers. The contents of the weight shift registers are then loaded into a weight matrix register so that the matrix multiplication can begin.

As illustrated in FIG. 2, each MXU, e.g., 113a and 113b, is connected to three buses, a first source bus for non-transposed weights (230a, 240b), a second source bus for transposed weights (220a, 220b), and a left-hand side bus (210a, 210b) for vector data to be multiplied by the matrix stored in the MXU. The MXUs are connected to the buses by wires that attach to the edges of the MXU. Each transpose unit (XU), e.g., 114a and 114b, is also connected to the first source bus and the second source bus.

The first and second source buses are multi-purpose buses that contain data sent from the vector processing unit to be consumed by either the XU or MXU. Data processing occurs in the vector processing data path, which includes vector registers 206, a serialize processing unit 202, and a selection unit 204. There are several ways that the vector processing unit can send weights on a bus. The weights may be sent normal, "hi," or "low." Eight 32-bit floating point numbers per lane (one per sublane) are rounded to bfloats, 16-bit floating point numbers. These values are packed into four pairs and sent to the MXU every other cycle over the course of 8 cycles. The difference between normal, "hi," and "low" is how the vector processing unit does the floating point 32-to-bfloat conversion. The weights may be packed meaning that each of the eight 32-bit values per lane contains a packed pair of bfloats. Sixteen values, rather than eight, values are sent to the MXU, using the source bus every cycle for eight consecutive cycles. During the odd cycles, the low 16-bits of each sublane are sent to the MXU, and during the even cycles, the high 16-bits of each sublane are sent to the MXU. The weights may additionally or alternatively be sent by byte. Each 32-bit operand contains a packed set of four 8-bit signed 2s complement integers. Each byte is converted to a modified sign-magnitude value. These values are sent to the MXU by way of a source bus over eight consecutive cycles.

The weights may be sent as non-transposed or transposed instructions using the first or second source buses and shifted into weight shift registers. When triggered with a load operation, the contents of the weight shift registers are loaded into weight matrices as described below. The load path from the weight shift registers to the weight matrix registers is also where conversion from modified sign-magnitude to bfloat is done with byte-mode data. A load control bus indicates whether this conversion is to be done.

Depending on the instruction being executed, the 32-bit values from the source buses may contain a packed pair of 16-bit floating point values with the values in bits [15:0] representing the earlier (in time) value, or a packed set of four 8-bit integers in modified sign-magnitude format with the value in bits [7:0] representing the earliest (in time) value and the other values following sequentially. When the MXU receives data from the buses, the data values are spread evenly across the MXU with the value 0 at the left side and the value 127 at the right side.

The LHS data bus delivers 128 16-bit floating point numbers in a specific format, e.g., bfloat, to be multiplied by the matrix stored in the connected MXU. The data of the LHS data bus comes from the vector processing unit and passes through the transpose unit, e.g., 114a and 114b. When the LHS input arrives at the MXU, the values are spread evenly across the MXU with value 0 at the left side and value 127 at the right side.

The result of the matrix multiply is spread evenly across the MXU and sent from the MXU to the matrix result FIFO (MRF), e.g., 136a and 136b. Results from the XUs are sent to the corresponding transpose result FIFO (TRF), e.g., 134a and 134b.

Figure 3:
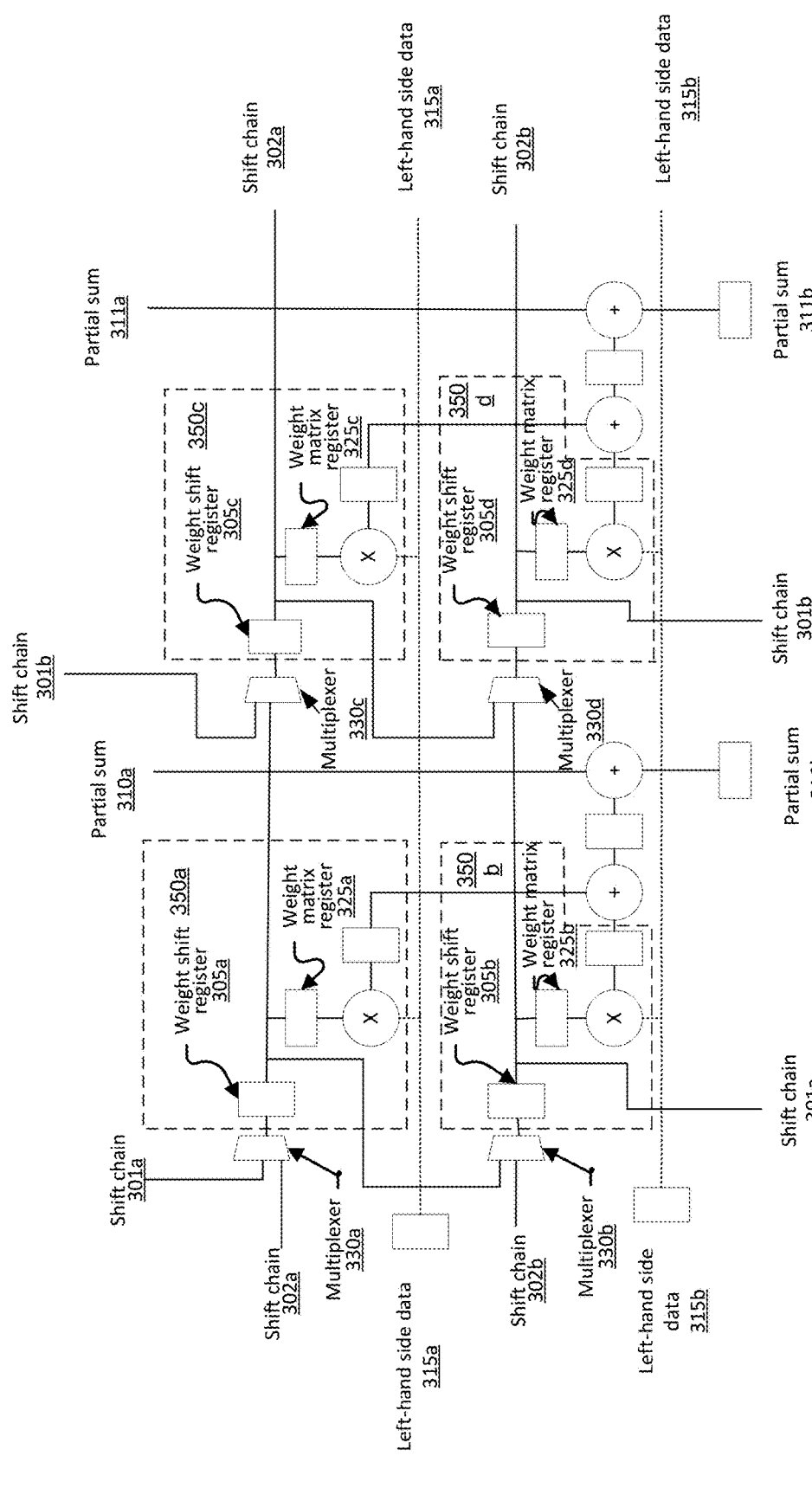
FIG. 3 illustrates an example architecture of a multi-cell inside a systolic array.

FIG. 3 illustrates an example architecture of a multi-cell inside a matrix multiply unit. As discussed above, the matrix multiply unit is a two-dimensional systolic array. The array includes multiple multiply-add sub-units that can be grouped into multi-cells. In some implementations, a first dimension of the systolic array corresponds to columns of cells and a second dimension of the systolic array corresponds to rows of cells. The systolic array can have more rows than columns, more columns than rows, or an equal number of columns and rows. This specification describes certain processing for columns or vertically. However, different designs can perform the processing for rows or horizontally.

In the illustrated example, left-hand side data registers 315a, 315b send vector data inputs to rows of the array. Weight shift chains 301A and 301B send weight input values to columns of the array, and weight shift chains 302a and 302b send weight input values to rows of the array. A shift chain is a wired pathway along which values can be passed, e.g., from a source bus and to each of various registers within the matrix multiply unit.

Each weight shift register 305 is designed to shift weight content values from a source bus along the chain of weight shift registers 305. After all the data is shifted in, a parallel copy operation ensures that all the data is copied from the weight shift registers 305 to the corresponding weight matrix registers 325. When the data is in the weight matrix registers 325, the data is used in any number of cycles of multiplications. During this time, more weights may be (and typically are) shifted into the weight registers 305 in the background in preparation for the next set of multiplications.

The left-hand side data registers 315a, 315b can receive the vector data inputs. Each left-hand side data register holds one LHS data item each clock cycle for one clock cycle. Each vector data input received by a multi-cell may be free-flowing in a corresponding left-hand side register of the multi-cell, such as the left-hand side data registers 315a, 315b. The left-hand side data registers store vector data inputs which may be provided by a vector register or by an adjacent multi-cell located to the left of the given multi-cell, depending on the position of the multi-cell within the array. For instance, if the multi-cell 300 is located at the left most position within the systolic array of the matrix multiply unit, the vector data inputs are provided by a vector register. The vector register may provide multiple different vector data inputs to the multi-cell 300, in which each received vector data input then may be stored by a different one of the left-hand side data registers 315. Each row receives one value each clock cycle, regardless of the number of rows that are grouped into a multi-cell.

Each left-hand side register may be coupled to cells along a first dimension of the array of multi-cells. The connection of the left-hand side registers to the cells is indicated by dotted lines in FIG. 3. For example, left-hand side data register 315a (a left-hand side data register) in the multi-cell is coupled to the cells 350a and 350c of the first row. Similarly, left-hand side data register 315b (a second left-hand register) in the multi-cell is coupled to the cells 350b and 350d of the second row. Each left-hand side register 315 transfers the stored vector data input to the cells 350 to which the left-hand register is coupled. Thus, for a given number of cells extending along a first dimension (e.g., along a given row or along a given column), the vector data inputs can be passed to all cells in the multi-cell, and not just a single cell, thereby causing the activation input to spread quickly throughout the array of cells, improving the efficiency of operation of the multi-cell.

The multiple vector data inputs can also be sent to an adjacent left-hand side register so that multiple vector data inputs can be used at another multi-cell of the array. This process allows vector inputs to be shifted for use in another particular multi-cell of the array.

Each cell 350 of a multi-cell 300 contains a stored weight value. Before beginning a matrix multiply process, weights are loaded by shifting them into the cells of the systolic array. Dedicated chains and weight shift registers are provided for weight shifting so that new weights can be shifted in concurrently with the execution of previous matrix multiply processing. Weight inputs can be loaded into multi-cells in ways that lower the latency of the overall matrix multiply operational processing.

As discussed above, the weight shift chains 301, 302 can receive weight inputs from a source bus. The shift chains can send multiple corresponding weight inputs to the weight registers 325 associated with the multi-cell 300.

In some implementations, weight shift registers shift vector data inputs throughout the array along one dimension, e.g., to the right, while shifting weight input throughout the array along one or both dimensions, e.g., to the right or to the bottom. For example, over one clock cycle, each vector data input of the multiple activation inputs at multi-cell 300 can shift to a corresponding left-hand side data register in the next multi-cell in the same row. Horizontal data (left-hand-side data) and vertical data (partial sums) each move by one multi-cell per clock cycle, every clock cycle. Weights only shift when instructed by the system and, depending on the implementation and the instructions executed, may shift 1, 2, or 4 rows (or columns).

A multiplexer 330 selects a weight either from a weight shift register 305 of the first shift chain 301 or the second shift chain 302 and forwards the selected input into a single line into the weight matrix register 325. Although multiplexers 330 are shown outside of the cell 350 boundary lines, in some implementations the multiplexers 330 exist within the cells 350.

On a clock cycle, each multi-cell can process the multiple given weight inputs and the multiple given activation inputs to generate multiple accumulated outputs. Generally, processing includes a multiplication operation to multiply an activation input with a stored weight. The accumulated outputs can also be passed to an adjacent multi-cell down along the same dimension as the given weight inputs. In some implementations, weights are shifted more than one multi-cell during a given clock cycle to transition from one convolution calculation to another.

The accumulated outputs can be passed along the same columns as weight inputs, e.g., towards the bottom of the column in the array. In some implementations, a partial sum register 310a, 311A passes a partial sum value into the multi-cell from a previous multi-cell. The array can include partial sum registers 310b, 311b that store the accumulated outputs from each column of multi-cells. For each column of the multi-cell, the products generated by the sub-unit cells in the column are combined with the incoming partial sum from the multi-cell above, and then sent on as the next partial sum. For certain multi-cells, e.g., the multi-cells in the bottom column of the systolic array, the accumulated outputs may include final accumulated values that can be transferred to a vector computation unit. In some implementations, the final accumulated values are transferred directly from the bottom multi-cells of the array to the vector computation unit while in other implementations, the final accumulated values are first stored in a memory or are processed by a different component before being sent to the vector computation unit.

In some implementations, on each clock cycle, each cell multiplies a given weight input and left-hand side data input to generate a product value. A cell can then combine the product value with a partial sum value received from another cell to generate an updated partial sum value. The cell can then transmit the partial sum value to another cell in the matrix computation unit.

Figure 4:
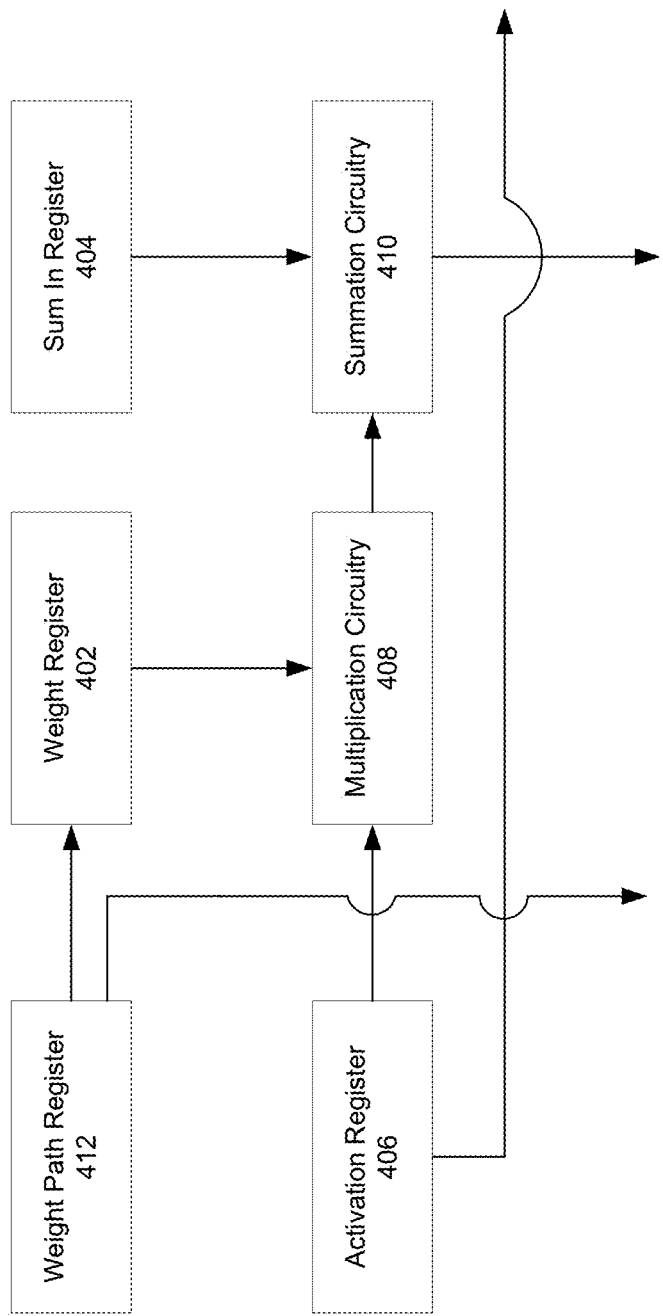
FIG. 4 shows an example architecture of a cell in a matrix computation unit.

FIG. 4 shows an example architecture 400 of a cell inside a systolic array.

The cell can include an activation register 406 that stores an activation input. The activation register can receive the activation input from a left adjacent cell, i.e., an adjacent cell located to the left of the given cell, or from a unified buffer, depending on the position of the cell within the systolic array. The cell can include a weight register 402 that stores a weight input. The weight input can be transferred from a top adjacent cell or from a weight fetcher interface, depending on the position of the cell within the systolic array. The cell can also include a sum in register 404. The sum in register 404 can store an accumulated value from the top adjacent cell. The activation register 406 and the weight register 402 can be registers that are configured to store values of a particular size, such as floating point values of a particular format.

Multiplication circuitry 408 can be used to multiply the weight input from the weight register 402 with the activation input from the activation register 406. The multiplication circuitry 408 can output the product to summation circuitry 410. In some implementations, the input and output values of the multiplication circuitry 408 may be of different sizes and/or formats.

The summation circuitry 410 can sum the product and the accumulated value from the sum in register 404 to generate a new accumulated value. The summation circuitry 410 can then send the new accumulated value to another sum in register located in a bottom adjacent cell. The new accumulated value can be used as an operand for a summation in the bottom adjacent cell. The summation circuitry 410 can also accept a value from the sum in register 404 and send the value from the sum in register 404 to a bottom adjacent cell without summing the value from the sum in register 404 with the product from the multiplication circuitry 408. In some implementations, the input values of the summation circuitry 410 may be of different sizes and/or formats. In some implementations, some input and output values of the summation circuitry 410 may be of different sizes and/or formats.

The cell can also shift the weight input and the activation input to adjacent cells for processing. For example, the weight path register 412 can send the weight input to another weight register in the bottom adjacent cell. The activation register 406 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 408, or can determine whether the multiplication circuitry 408 operates on the activation and weight inputs. The control signal can also be passed to one or more adjacent cells, e.g., using a wire.

In some implementations, weights are pre-shifted into a weight path register 412. The weight path register 412 can receive the weight input, e.g., from a top adjacent cell, and transfer the weight input to the weight register 402 based on the control signal. The weight register 402 can statically store the weight input such that as activation inputs are transferred to the cell, e.g., through the activation register 406, over multiple clock cycles, the weight input remains within the cell and is not transferred to an adjacent cell. Therefore, the weight input can be applied to multiple activation inputs, e.g., using the multiplication circuitry 408, and respective accumulated values can be transferred to an adjacent cell.

Figure 5:
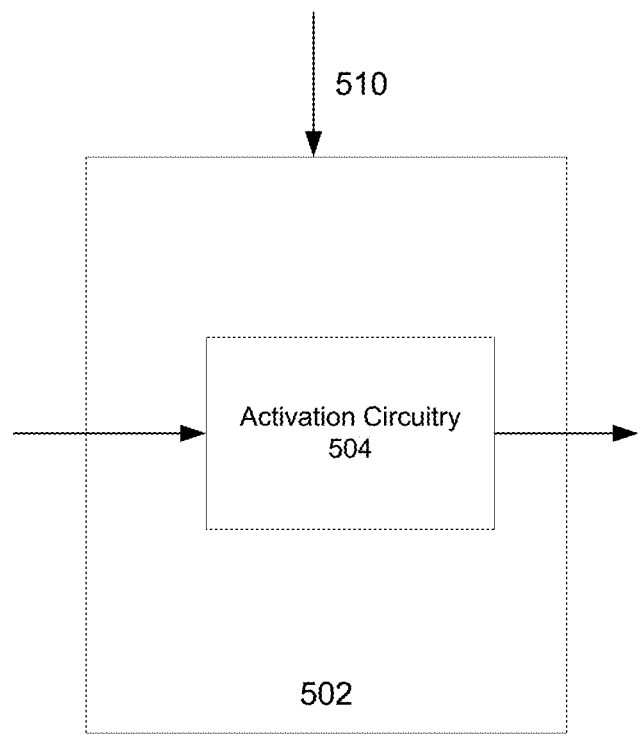
FIG. 5 shows an example architecture of a vector computation unit.

FIG. 5 shows an example architecture 500 of a vector computation unit 502. The vector computation unit 502 can receive a vector of accumulated values from a matrix computation unit, e.g., the matrix computation unit 312 described in reference to FIG. 3.

Control signals 510 can be transferred and can regulate how the vector computation unit 502 processes the vector of accumulated values. That is, the control signals 510 can regulate whether the left-hand data values are pooled, where the left-hand data values are stored or can otherwise regulate handling of the activation values. The control signals 510 can also specify the activation or pooling functions, as well as other parameters for processing the activation values or pooling values, e.g., a stride value.

The vector computation unit 502 can send values, e.g., left-hand data values or pooled values. In some implementations, the pooling circuitry 508 receives the activation values or pooled values and stores the activation values or pooled values in the unified buffer.

Figure 6:
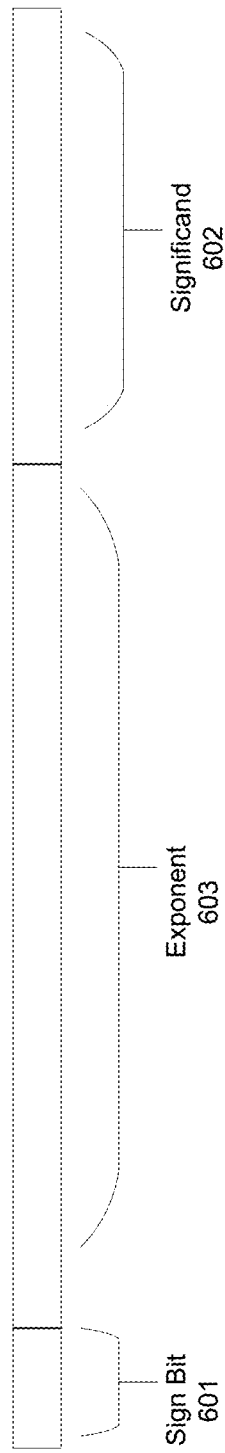
FIG. 6 shows an example format for a floating point value.

FIG. 6 shows an example format 600 for a floating point value. Each of the values processed by a matrix computation unit, e.g., the values stored by registers of cells of a matrix computation unit, may be stored as a floating point value with a particular format.

The format 600 is characterized by a sign bit 601, a group of bits known as significand 602, and another group of bits known as an exponent 603.

The sign bit 601 indicates whether a value stored using the format 600 is positive or negative. The significand 602 includes one or more significant digits of a value stored using the format 600. Therefore, the size, i.e., number of bits, of the significand 602 of the format 600 represents a maximum possible precision of any value stored using the format 600. The exponent 603 represents the power of a scaling base used to convert the stored value into a normalized form. Therefore, the size of the exponent 603 of the format 600 represents a maximum possible dynamic range of any value stored using the format 600.

In some cases, the normalized form that the system uses to interpret floating point numbers contains one or more constant values. For example, the normalized form can always be the form 1.XXXX*2^XXXX, where the integer portion of the first value is always constant, e.g., equal to 1. In some such cases, the significand 602 may only include the non-constant bits of the normalized value and not include the constant bits. In these cases, the bits of the normalized form that are constant and thus do not appear in the significand 602 are said to be "hidden bits." A computer system interpreting a binary floating point value having hidden bits will add the hidden bits to the significand 602 in accordance with the normalized form underlying the format 600 of the value.

The manner in which a computer system stores a binary number as a floating point value depends on the normalized form that the system uses to interpret floating point numbers and the size of the significand 602 and the exponent 603 of the particular floating point format 600 used. For example, a floating point format 600 may include a sign bit 601, 4 bits of significand 602, and 3 bits of exponent 602, and a computer system can interpret a binary number having this format 600 by assuming that the number has the normalized form X.XXX*2^XXX, where X is a single binary number, i.e., a "0" or a "1". Moreover, the computer system can assume that that the binary value before the decimal point in the first value of the normalized form is a hidden bit that is always one and does not appear in the significand 602. Thus, such a computer system can store and interpret the binary number +11.111 with a floating point value having a sign bit 601 of "0" (because the binary number is positive), an exponent 603 of "001," and a significand 602 of 1111.

If a computer system cannot properly store a number using a format, an attempt to store the number can cause an overflow and lead to unpredictable or undesirable behavior. The example above illustrates that a computer system can store a binary number whose number of digits exceed the maximum precision allowed in the significand 602 of the format 600 adopted by the system without an overflow through rounding the digits. Even though such rounding leads to reduced precision, it will not cause an overflow.

On the other hand, if the dynamic range of a binary number exceeds the maximum range allowed in the exponent 603 of the format 600, the computer system cannot round the dynamic range. Continuing the example given above, the computer system cannot store and interpret the number 111111111.012 because the normalized form of that number has a dynamic range of 10002 and this dynamic range cannot be represented in the range of values allowed in the exponent 603 of the format 600 using the example exponent width of 3 bits.

As another example, the system may use a bfloat format of 8 bits of exponent and 7 bits of significand. To reduce the possibility of an overflow, if an operation in a computer system in any way transforms a first floating point value having a first format to a second floating point value having a second format, it is important that the dynamic range of the second format be greater than or equal to the dynamic range of the first format. This includes the circumstances in which the system is converting the first floating point value to the second floating point value and the circumstances in which the system is applying an operation on the first floating point value to generate the second floating point value. For example, if the computer system multiplies two values having a first format to generate a result value having a second format, it is important that the dynamic range of the second format be greater than or equal to the dynamic range of the first format to reduce the possibility of an overflow. If the two values being multiplied have different formats, it is important that the dynamic range of the second format be greater than or equal to the dynamic range of the format having the greater dynamic range to reduce the possibility of an overflow.

Examples of floating points formats 600 include an IEEE single-precision format, a bfloat format, and an expanded bfloat format.

The IEEE single-precision format is a 32-bit format that includes a sign bit 601, 8 bits of exponent 603, and a 23 bits of significand 602. A bfloat format is a 16-bit format that has a sign bit 601, 8 bits of exponent 603, and 7 bits of significand 602. An expanded bfloat format is a 20-bit format that includes a 20-bit format that includes a sign bit 601, 8 bits of exponent 603, and 11 bits of significand 602.

Importantly, all the three formats noted above have the same exponent 602 size and thus the same dynamic range. However, the single-precision format allows for more precision than the expanded bfloat format, and the expanded bfloat format allows for more precision than the bfloat format. To reduce the possibility of overflow but increase precision, a matrix computation unit can store activation input and weight input values in registers holding values of the bfloat format, hold the product of the input values in a register holding values of the expanded bfloat format, and hold the sum of the product value and a partial sum value in a register holding values of the IEEE single precision format.

Figure 7:
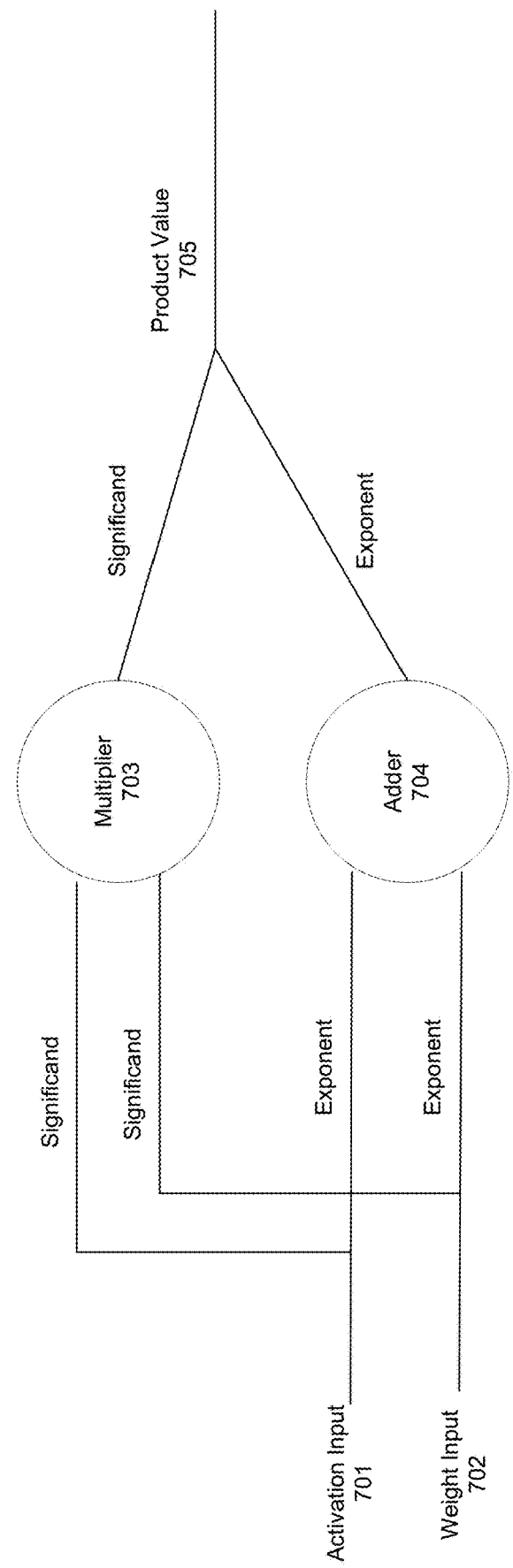
FIG. 7 shows an example architecture for multiplication circuitry of a matrix computation cell.

FIG. 7 shows an example architecture 700 for multiplication circuitry of a matrix computation cell. The matrix computation cell depicted in FIG. 7 multiplies two input values, e.g., an activation input value 701 and a weight input value 702, to generate a resulting value, e.g., a product value 705.

The architecture 700 includes a multiplier 703 that multiplies the significand and the sign bit of the two input values to generate a significand and a sign bit of the resulting value and an adder 804 that adds the exponent of the two input values to generate an exponent of the resulting value. The combination of the significand and the sign bit and the exponent of the resulting value generates the resulting value.

Figure 8:
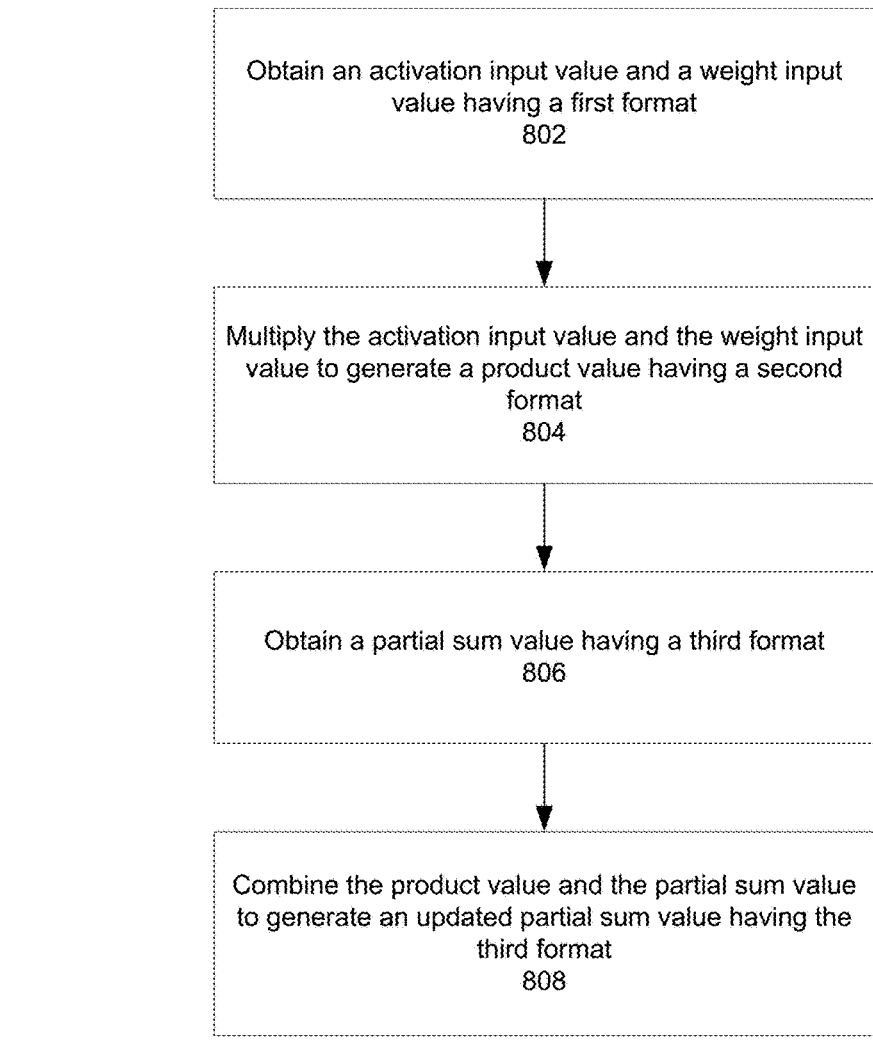
FIG. 8 is a flow diagram of an example process for performing matrix multiplication using a matrix computation unit.

FIG. 8 is a flow diagram of an example process 800 for performing matrix multiplication using a matrix computation unit. The process 800 can be performed by a matrix computation unit, e.g., the matrix computation unit 113 of FIG. 2, to perform matrix multiplication in accordance with an architecture of the matrix computation unit.

A matrix computation unit can perform the process 800 multiple times in parallel to compute a vector output that is a product of a vector and a matrix, e.g., an input vector including multiple activation input values and a weight matrix including multiple activation weight values.

The matrix computation unit obtains an activation input value and a weight input value that both have a first floating point format (802). Obtaining the activation input and the weight input values is described in greater detail below with reference to FIG. 9.

The matrix computation unit multiplies, using a multiplication circuitry of the matrix computation unit, the activation input value and the weight input value to generate a product value having a second floating point format (804). The second floating point format has a higher precision than the first floating point format and has a dynamic range that is at least as large as the dynamic range of the first floating point format. By storing the result of multiplying the activation input value and the weight input value in a format that has a higher precision than the format of those input values, the matrix computation unit reduces the likelihood of lost precision in storing the result of the multiplication. By storing the result of multiplying the activation input value and the weight input value in a format that has a dynamic range that is at least as large as the dynamic range of the format of those input values, the matrix computation unit also reduces the likelihood of overflow in storing the result of the multiplication.

Multiplying the activation input value and the weight input value is described in greater detail below with reference to FIGS. 8-9.

In some implementations, the first floating point format is a 16 bit format with a sign bit, an 8 bit exponent, and a 7 bit significand that optionally does not include a hidden bit in the normalized form of a corresponding binary number, and the second floating point format is a 20 bit format with a sign bit, an 8 bit exponent, and a 11 bit significand that optionally does not include a hidden bit in the normalized form of a corresponding binary number.

The matrix computation unit obtains a partial sum value in a third floating point format (806). The matrix computation unit can obtain the partial sum value from a cell in the matrix computation unit.

The third floating point format has a higher precision than the first floating point format and has a dynamic range that is at least as large as the dynamic range of the first floating point format. Therefore, the partial sum value has a format that allows for greater precision than the format of the input values and a dynamic range that is as at least as great as the dynamic range of the format of the input values.

In some implementations, the third floating point format has a higher precision than the second floating point format. In other words, the three floating point formats can be ranked in terms of their precision in the following order, starting with the format with the highest precision: the third floating point format, the second floating point format, and the first floating point format. In some implementations, the third floating point format has a dynamic range that is at least as great as the dynamic range of the second floating point format.

In some implementations, the third floating point format is an IEEE standard 754 single precision format or other 32 bit format with a sign bit, an 8 bit exponent, and a 23 bit significand that does not include a hidden bit in the normalized form of a corresponding binary number.

The matrix computation unit combines, using a summation circuitry of the matrix computation unit, the partial sum value and the product value to generate an updated partial sum value having the third format (808). By storing the result of combining the product value and the partial sum value in the same format as the format of the partial sum value, the matrix computation unit reduces the likelihood of overflow or lost precision. This is especially the case in implementations in which the format of the product value, i.e., the second format, has a lower precision than the format of the updated partial sum value, i.e., the third format. In such implementations, the matrix computation unit reduces the likelihood of lost precision by storing the result of the combination in a format that has a higher precision than the format of the product value. Similarly, in implementations in which the third format has a dynamic range that is at least as great as the dynamic range of the second format, the matrix computation unit reduces the likelihood of overflow by storing the result of the combination in a format that has a greater dynamic range than the format of the product value.

In some implementations, the matrix computation unit transmits the updated partial sum to another component of the matrix computation unit, e.g., a cell in the matrix computation unit or a multi-cell structure in the matrix computation unit.

Figure 9:
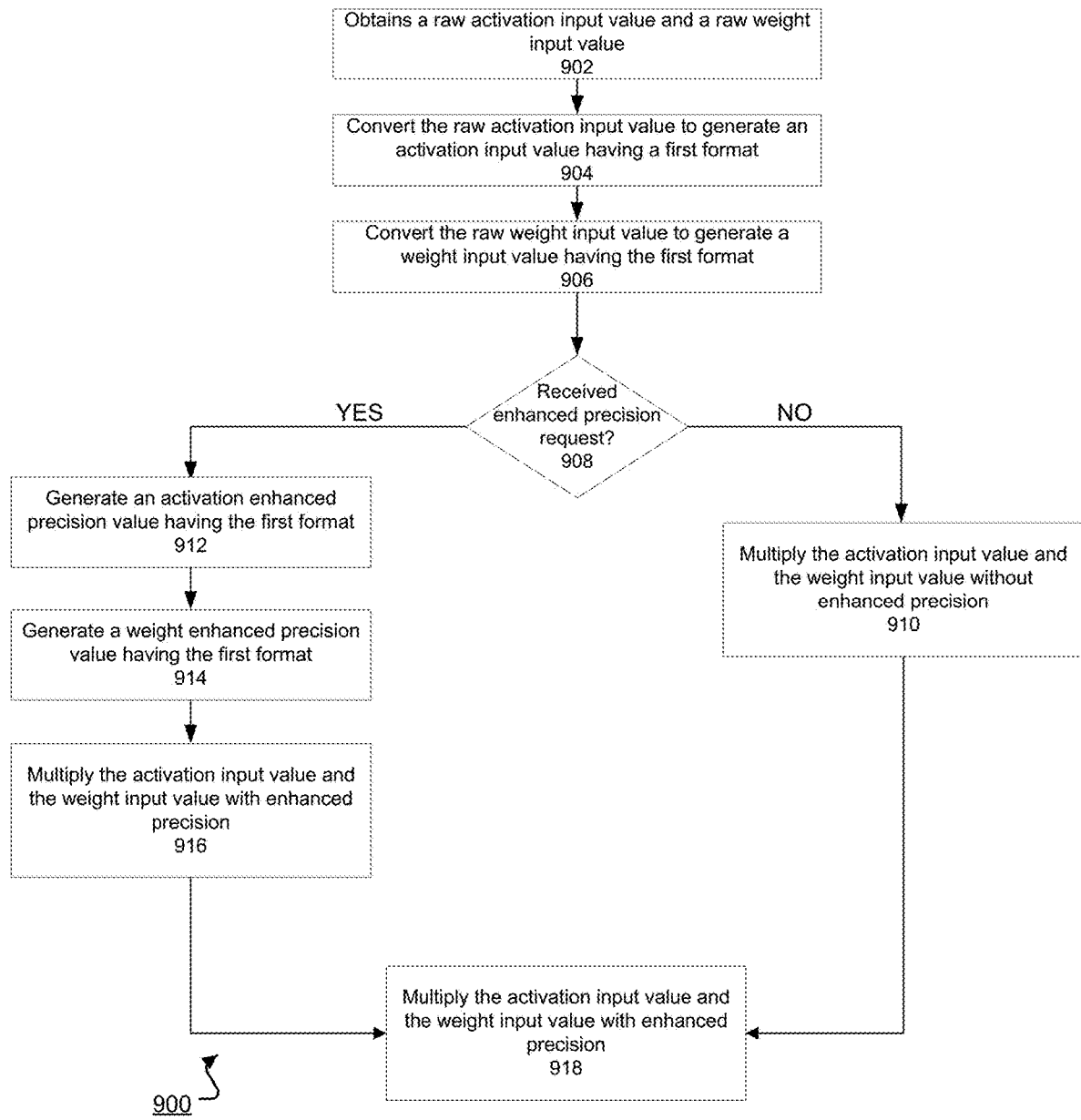
FIG. 9 is a flow diagram of an example process for performing multiplication of an activation input value by a weight input value.

FIG. 9 is a flow diagram of an example process 900 for performing a multiplication of an activation input value by a weight input value. For convenience, the process 900 will be described as being performed by a system of one or more computers located in one or more locations. For example, a neural network processing system, e.g., the neural network processing system 100 of FIG. 1, appropriately programmed in accordance with this specification, can perform the process 900.

A neural network system can perform the process 900 multiple times in parallel to compute a vector output that includes the higher-precision portion of the product of a vector and a matrix, e.g., an input vector including multiple activation input values and a weight matrix including multiple activation weight values, and a vector outputs that includes the lower-precision portion of the product of the vector and the matrix.

The system obtains a raw activation value and a raw weight value (902). The system may obtain the raw values from a neural network implementation engine of the system, e.g., the neural network implementation engine 150 of FIG. 1. The raw values may be in any format, such as an IEEE single-precision floating point format.

The system converts the raw activation value to a first format to generate an activation input value (904) and converts the raw weight value to the first format to generate a weight input value (906). The system can store the number represented by the raw activation value as a new value with a new format.

The system determines if it has received a request to multiply the raw activation value and the activation input value with enhanced precision (908). The system may receive this enhanced precision request from an end user of the system and/or by a neural network implementation engine of the system, e.g., the neural network implementation engine 150 of FIG. 1. The request indicates that the system must store the result of multiplying the raw activation value and the activation input value with reduced loss of precision.

In some implementations, the system receives an enhanced precision request through software instructions, i.e., VLIW instruction bundles. These instruction bundles may include matrix multiply instructions that have a number of different possible opcodes used to express various options such as the constituent parts of an enhanced precision matrix multiply. If the system determines that it has not received an enhanced precision request, the system multiplies, using a matrix computation unit of a hardware circuitry on which the system is implemented, the activation input value and the raw activation value as individual values to generate a product value having a second format (910).

Otherwise, if the system determines that it has received an enhanced precision request, the system generates an activation enhanced precision value that is the difference between the raw activation value and the activation input value (912) and generates a weight enhanced precision value that is the difference between the raw weight value and the weight input value (914). The system generates the difference between the activation input value and the raw input value by subtracting the activation input value from the raw activation value and generates the difference between the weight input value and the raw weight value by subtracting the weight input value from the raw weight value. The system can do the subtraction of two values using appropriate circuitry outside the matrix computation unit, such as using summation circuitry outside the matrix computation unit by adding a first value to a negation of a second value. The activation enhanced precision value and the weight enhanced precision value are both values in the first floating point format.

The system performs, using the matrix computation unit, a set of multiplications between (916) the activation input value, the weight input value, the activation enhanced precision value, and the weight enhanced precision value. To perform a multiplication between two values using the matrix computation unit, the system provides the two values to the matrix computation unit to cause the matrix computation unit to perform a multiplication of the two values.

In some implementations, the set of multiplications include: multiplying the activation input value by the weight input value, multiplying the activation input value by the weight enhanced precision value, multiplying the weight input value by the activation enhanced precision value, and multiplying the activation enhanced precision value by the weight enhanced precision value.

Software instructions determine what subset of possible multiplications to include. In some implementations, the set of multiplications only include multiplying the activation input value by the weight input value and multiplying the activation enhanced precision value by the weight enhanced precision value. This technique can be used to reduce the number of required multiplications when the system determines that at least some of the individual input values and enhanced precision values have a required level of exactness.

The enhanced precision values indicate at least some of the lower-precision portion of the raw values that were lost in rounding when storing the raw values in the input values that have the first format. By using those enhanced precision values in a multiplication, the system can perform multiplications that involve the higher precision portion of the raw values and thus produce a multiplication result that has a greater precision.

The system then combines the products of the four multiplications to generate (918) a first value in the first format that that includes the lower precision portion of the result of multiplying the raw values and a second value in the first format that includes the higher portion of the result of multiplying the raw values. In some implementations, the system performs the summation using an external summation circuitry that is external to the matrix computation unit.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Embodiment 1 is a method of performing a matrix multiplication using a hardware circuit, the method comprising: obtaining, by a matrix computation unit of the hardware circuit, an input activation value and a weight input value, the input activation value and the weight input value each having a first floating point format; multiplying, by a multiplication circuitry of the matrix computation unit, the input activation value and the weight input value to generate a product value, the product value having a second floating point format that has a higher precision than the first floating point format and has a dynamic range that is at least as large as the dynamic range of the first floating point format; obtaining, by the matrix computation unit, a partial sum value in a third floating point format that has a higher precision than the first floating point format and has a dynamic range that is at least as large as the dynamic range of the first floating point format; and combining, by a summation circuitry of the hardware circuit, at least the partial sum value and the product value to generate an updated partial sum value that has the third floating point format.

Embodiment 2 is the method of embodiment 1, wherein the precision of a floating point format is determined based on a count of available bits for a significand in the floating point format and the dynamic range of a floating point format is determined based on a count of available bits for an exponent in the floating point format.

Embodiment 3 is the method of any one of embodiments 1-2, wherein the second floating point format has the same dynamic range as the first floating point format and the third floating point format has the same dynamic range as the first floating point format.

Embodiment 4 is the method of any one of embodiments 1-3, wherein the third floating point format has a higher precision than the second floating point format.

Embodiment 5 is the method of any one of embodiments 1-4, wherein: the hardware circuit is configured to perform computations for a neural network having a plurality of layers, and the input activation value and the weight input value are associated with a layer of the plurality of layers.

Embodiment 6 is the method of any one of embodiments 1-5, further comprising: obtaining a raw activation value and a raw weight value for the first matrix computation cell having the third floating point format; converting the raw activation value into the first floating point format to generate the input activation value; and converting the raw weight value into the first floating point format to generate the weight input value.

Embodiment 7 is the method of any one of embodiments 1-6, further comprising: receiving a request to process the raw activation value with enhanced precision; generating an activation enhanced precision value for the input value, the activation enhanced precision value being a measure of difference between the activation input value and the raw activation value; and generating a weight enhanced precision value for the weight input value, the weight enhanced precision value being a measure of difference between the weight input value and the raw weight value; and wherein, multiplying the activation input value and the weight input value to generate the product value comprises: multiplying, by the multiplication circuitry of the matrix computation unit, the input value by the weight input value, the input value by the weight enhanced precision value, the weight input value by the activation enhanced precision value, and the activation enhanced precision value by the weight enhanced precision value, and combining products of the multiplications to generate the product value.

Embodiment 8 is a hardware circuit comprising: a matrix computation unit configured to perform a first group of operations comprising: obtaining an activation input value and a weight input value, the activation input value and the weight input value both having a first floating point format; storing the weight input value in a weight register, the weight register being configured to store values having the first floating point format; multiplying, a using multiplication circuitry of the hardware circuit, the activation input value and the weight input value to generate a product value, the product value having a second floating point format that has a higher precision than the first floating point format and has a dynamic range that is at least as large as the dynamic range of the first floating point format; obtaining a partial sum value in a third floating point format that has a higher precision than the first floating point format and has a dynamic range that is at least as large as the dynamic range of the first floating point format; storing the partial sum value in a sum in register, the sum in register being configured to store values having the third floating point format; and combining, using a summation circuitry of the matrix computation unit, the partial sum value and the product value to generate an updated partial sum value that has the third floating point format.

Embodiment 9 is the hardware circuit of embodiment 8, the first group of operations further comprising: storing the activation input value in an activation register, the activation register being configured to store values having the first floating point format.

Embodiment 10 is the hardware circuit of any one of embodiments 8-9, the first group of operations further comprising: storing the weight input value in a weight register, the weight register being configured to store values having the first floating point format.

Embodiment 11 is the hardware circuit of any one of embodiments 8-10, the first group of operations further comprising: storing the partial sum value in a sum in register, the sum in register being configured to store values having the third floating point format.

Embodiment 12 is the hardware circuit of any one of embodiments 8-11, further comprising an external summation circuitry outside the matrix computation unit, and wherein the first group of operations further comprises: receiving a request to process the raw activation value with enhanced precision; generating an activation enhanced precision value for the input value, the activation enhanced precision value being a measure of difference between the activation input value and the raw activation value; and generating a weight enhanced precision value for the weight input value, the weight enhanced precision value being a measure of difference between the weight input value and the raw weight value; and wherein, multiplying the activation input value and the weight input value to generate the product value comprises: multiplying, by the multiplication circuitry of the matrix computation unit, the input value by the weight input value, the input value by the weight enhanced precision value, the weight input value by the activation enhanced precision value, and the activation enhanced precision value by the weight enhanced precision value, and wherein the external summation circuitry is configured to perform a second group of operations comprising: combining products of the multiplications to generate the product value.

Embodiment 13 is a system comprising one or more computers and one or more storage devices storing instructions that are operable, when executed by the one or more computers, to cause the one or more computers to perform the operations of the respective method of any one of embodiments 1-7.

Embodiment 14 is a computer storage medium encoded with instructions that, when executed by one or more computers, cause the one or more computers to perform the operations of the respective method of any one of embodiments 1-7.

Embodiment 15 is a system comprising one or more computers and one or more storage devices storing instructions that are operable, when executed by the one or more computers, to cause the one or more computers to perform the operations of the respective hardware circuit of any one of embodiments 8-12.

Embodiment 16 is a computer storage medium encoded with instructions that, when executed by one or more computers, cause the one or more computers to perform the operations of the respective hardware circuit of any one of embodiments 8-12.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of performing a matrix multiplication using a hardware circuit, the method comprising:
    obtaining, by a matrix computation unit of the hardware circuit, an input activation value and a weight input value, the input activation value and the weight input value each having a first floating point format, wherein the hardware circuit is configured to perform computations for a neural network having a plurality of layers, wherein the input activation value and the weight input value are associated with a layer of the plurality of layers;
    multiplying, by a multiplication circuitry of the matrix computation unit, the input activation value and the weight input value to generate a product value, the product value having a second floating point format that has a higher precision than the first floating point format and has a dynamic range that is at least as large as the dynamic range of the first floating point format;
    obtaining, by the matrix computation unit, a partial sum value in a third floating point format that has a higher precision than the first floating point format and has a dynamic range that is at least as large as the dynamic range of the first floating point format; and
    combining, by a summation circuitry of the hardware circuit, at least the partial sum value and the product value to generate an updated partial sum value that has the third floating point format.

2. The method of claim 1, wherein the precision of a floating point format is determined based on a count of available bits for a significand in the floating point format and the dynamic range of a floating point format is determined based on a count of available bits for an exponent in the floating point format.

3. The method of claim 1, wherein the second floating point format has the same dynamic range as the first floating point format and the third floating point format has the same dynamic range as the first floating point format.

4. The method of claim 1, wherein the third floating point format has a higher precision than the second floating point format.

5. The method of claim 1, further comprising:
    obtaining a raw activation value and a raw weight value for the first matrix computation cell having the third floating point format;
    converting the raw activation value into the first floating point format to generate the input activation value; and
    converting the raw weight value into the first floating point format to generate the weight input value.

6. The method of claim 5, further comprising:
    receiving a request to process the raw activation value with enhanced precision;
    generating an activation enhanced precision value for the input value, the activation enhanced precision value being a measure of difference between the activation input value and the raw activation value; and
    generating a weight enhanced precision value for the weight input value, the weight enhanced precision value being a measure of difference between the weight input value and the raw weight value; and
    wherein, multiplying the activation input value and the weight input value to generate the product value comprises:
        multiplying, by the multiplication circuitry of the matrix computation unit,
            the input value by the weight input value,
            the input value by the weight enhanced precision value,
            the weight input value by the activation enhanced precision value, and
            the activation enhanced precision value by the weight enhanced precision value, and
        combining products of the multiplications to generate the product value.

7. A hardware circuit comprising:
    a matrix computation unit configured to perform a first group of operations comprising:
        obtaining an activation input value and a weight input value, the activation input value and the weight input value both having a first floating point format, wherein the hardware circuit is configured to perform computations for a neural network having a plurality of layers, wherein the activation input value and the weight input value are associated with a layer of the plurality of layers;
        storing the weight input value in a weight register, the weight register being configured to store values having the first floating point format;
        multiplying, a using multiplication circuitry of the hardware circuit, the activation input value and the weight input value to generate a product value, the product value having a second floating point format that has a higher precision than the first floating point format and has a dynamic range that is at least as large as the dynamic range of the first floating point format;
        obtaining a partial sum value in a third floating point format that has a higher precision than the first floating point format and has a dynamic range that is at least as large as the dynamic range of the first floating point format;

storing the partial sum value in a sum in register, the sum in register being configured to store values having the third floating point format; and combining, using a summation circuitry of the matrix computation unit, the partial sum value and the product value to generate an updated partial sum value that has the third floating point format.

8. The hardware circuit of claim 7, the first group of operations further comprising:

storing the activation input value in an activation register, the activation register being configured to store values having the first floating point format.

9. The hardware circuit of claim 7, the first group of operations further comprising:

storing the weight input value in a weight register, the weight register being configured to store values having the first floating point format.

10. The hardware circuit of claim 7, the first group of operations further comprising:

storing the partial sum value in a sum in register, the sum in register being configured to store values having the third floating point format.

11. The hardware circuit of claim 7, further comprising an external summation circuitry outside the matrix computation unit, and wherein the first group of operations further comprises:

receiving a request to process the raw activation value with enhanced precision;

generating an activation enhanced precision value for the input value, the activation enhanced precision value being a measure of difference between the activation input value and the raw activation value; and generating a weight enhanced precision value for the weight input value, the weight enhanced precision value being a measure of difference between the weight input value and the raw weight value; and wherein, multiplying the activation input value and the weight input value to generate the product value comprises:

multiplying, by the multiplication circuitry of the matrix computation unit,
the input value by the weight input value,
the input value by the weight enhanced precision value,
the weight input value by the activation enhanced precision value, and
the activation enhanced precision value by the weight enhanced precision value, and wherein the external summation circuitry is configured to perform a second group of operations comprising:
combining products of the multiplications to generate the product value.

12. A system comprising one or more computers and one or more storage devices storing instructions that are operable, when executed by the one or more computers, to cause the one or more computers to perform the operations of:

obtaining an input activation value and a weight input value, the input activation value and the weight input value each having a first floating point format, wherein the one or more computers are configured to perform computations for a neural network having a plurality of layers, wherein the input activation value and the weight input value are associated with a layer of the plurality of layers;

multiplying the input activation value and the weight input value to generate a product value, the product value having a second floating point format that has a higher precision than the first floating point format and has a dynamic range that is at least as large as the dynamic range of the first floating point format;

obtaining a partial sum value in a third floating point format that has a higher precision than the first floating point format and has a dynamic range that is at least as large as the dynamic range of the first floating point format; and combining at least the partial sum value and the product value to generate an updated partial sum value that has the third floating point format.

13. A computer storage medium encoded with instructions that, when executed by one or more computers, cause the one or more computers to perform the operations of the respective method of:

obtaining an input activation value and a weight input value, the input activation value and the weight input value each having a first floating point format, wherein the one or more computers are configured to perform computations for a neural network having a plurality of layers, wherein the input activation value and the weight input value are associated with a layer of the plurality of layers;

multiplying the input activation value and the weight input value to generate a product value, the product value having a second floating point format that has a higher precision than the first floating point format and has a dynamic range that is at least as large as the dynamic range of the first floating point format;

obtaining a partial sum value in a third floating point format that has a higher precision than the first floating point format and has a dynamic range that is at least as large as the dynamic range of the first floating point format; and combining at least the partial sum value and the product value to generate an updated partial sum value that has the third floating point format.

14. A system comprising one or more computers and one or more storage devices storing instructions that are operable, when executed by the one or more computers, to cause the one or more computers to perform the operations of a respective hardware circuit of:

obtaining an activation input value and a weight input value, the activation input value and the weight input value both having a first floating point format, wherein the respective hardware circuit is configured to perform computations for a neural network having a plurality of layers, wherein the input activation value and the weight input value are associated with a layer of the plurality of layers;

storing the weight input value in a weight register, the weight register being configured to store values having the first floating point format;

multiplying the activation input value and the weight input value to generate a product value, the product value having a second floating point format that has a higher precision than the first floating point format and has a dynamic range that is at least as large as the dynamic range of the first floating point format;

obtaining a partial sum value in a third floating point format that has a higher precision than the first floating point format and has a dynamic range that is at least as large as the dynamic range of the first floating point format;

storing the partial sum value in a sum in register, the sum in register being configured to store values having the third floating point format; and combining the partial sum value and product value to generate an updated partial sum value that has the third floating point format.

15. A computer storage medium encoded with instructions that, when executed by one or more computers, cause the one or more computers to perform the operations of a respective hardware circuit of:

obtaining an activation input value and a weight input value, the activation input value and the weight input value both having a first floating point format, wherein the hardware circuit is configured to perform computations for a neural network having a plurality of layers, wherein the activation input value and the weight input value are associated with a layer of the plurality of layers;

storing the weight input value in a weight register, the weight register being configured to store values having the first floating point format;

multiplying the activation input value and the weight input value to generate a product value, the product value having a second floating point format that has a higher precision than the first floating point format and has a dynamic range that is at least as large as the dynamic range of the first floating point format;

obtaining a partial sum value in a third floating point format that has a higher precision than the first floating point format and has a dynamic range that is at least as large as the dynamic range of the first floating point format;

storing the partial sum value in a sum in register, the sum in register being configured to store values having the third floating point format; and combining the partial sum value and product value to generate an updated partial sum value that has the third floating point format.

* * * * *